US010047315B2

(12) United States Patent
Takahashi et al.

(10) Patent No.: US 10,047,315 B2
(45) Date of Patent: Aug. 14, 2018

(54) REFRIGERATION OIL AND WORKING FLUID COMPOSITION FOR REFRIGERATION OIL

(71) Applicant: JXTG NIPPON OIL & ENERGY CORPORATION, Tokyo (JP)

(72) Inventors: Hitoshi Takahashi, Tokyo (JP); Tsutomu Takahashi, Tokyo (JP); Souichirou Konno, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 15/521,653

(22) PCT Filed: Nov. 11, 2015

(86) PCT No.: PCT/JP2015/081742
§ 371 (c)(1),
(2) Date: Apr. 25, 2017

(87) PCT Pub. No.: WO2016/080264
PCT Pub. Date: May 26, 2016

(65) Prior Publication Data
US 2017/0240834 A1   Aug. 24, 2017

(30) Foreign Application Priority Data
Nov. 18, 2014   (JP) ................................. 2014-233735

(51) Int. Cl.
*C09K 5/04* (2006.01)
*C10M 105/38* (2006.01)
*C10M 129/10* (2006.01)
*C10M 171/00* (2006.01)

(52) U.S. Cl.
CPC ........... *C10M 105/38* (2013.01); *C09K 5/045* (2013.01); *C10M 129/10* (2013.01); *C10M 171/008* (2013.01); *C09K 2205/126* (2013.01); *C09K 2205/24* (2013.01); *C10M 2207/023* (2013.01); *C10M 2207/2835* (2013.01); *C10N 2220/302* (2013.01); *C10N 2230/10* (2013.01); *C10N 2240/30* (2013.01)

(58) Field of Classification Search
CPC ........... C10M 171/008; C10N 2030/00; C10N 2030/06; C10N 2030/10; C09K 2205/126; C09K 5/04; C09K 5/045
USPC .................................................... 252/68, 69
See application file for complete search history.

(56) References Cited

U.S. PATENT DOCUMENTS

| | | | | |
|---|---|---|---|---|
| 5,100,569 A | * | 3/1992 | Nalewajek | C10M 171/008 252/68 |
| 2010/0133463 A1 | * | 6/2010 | Kaneko | C10M 169/04 252/68 |
| 2010/0147016 A1 | * | 6/2010 | Kaneko | F04B 39/02 62/468 |
| 2012/0132848 A1 | * | 5/2012 | Sawada | C09K 5/045 252/68 |
| 2013/0012420 A1 | * | 1/2013 | Matsumoto | C09K 5/045 508/569 |
| 2013/0313469 A1 | * | 11/2013 | Kaneko | C10M 169/04 252/68 |
| 2014/0070132 A1 | | 3/2014 | Fukushima | |
| 2014/0128302 A1 | * | 5/2014 | Matsumoto | C09K 5/045 508/465 |
| 2014/0135241 A1 | * | 5/2014 | Matsumoto | C09K 5/045 508/304 |
| 2016/0347980 A1 | * | 12/2016 | Okamoto | C09K 5/045 |
| 2016/0355716 A1 | * | 12/2016 | Fukushima | C09K 5/045 |
| 2016/0355719 A1 | * | 12/2016 | Fukushima | C09K 5/045 |
| 2017/0058174 A1 | * | 3/2017 | Fukushima | C09K 5/04 |
| 2017/0166831 A1 | * | 6/2017 | Matsumoto | C10M 171/008 |
| 2017/0198236 A1 | * | 7/2017 | Hiyoshi | C10M 171/008 |

FOREIGN PATENT DOCUMENTS

| | | |
|---|---|---|
| CN | 103562338 | 2/2014 |
| JP | 2003049184 A | 2/2003 |
| TW | 201414828 | 4/2014 |
| WO | 2012/157764 A1 | 11/2012 |
| WO | 2015/125878 A1 | 8/2015 |
| WO | 2015/125881 A1 | 8/2015 |
| WO | 2015/137166 A1 | 9/2015 |

OTHER PUBLICATIONS

CAS No. 128-37-0, Nov. 16, 1984.*
International Search Report issued in Patent Application No. PCT/JP2015/081742, dated Dec. 8, 2015.
Office Action issued in Taiwan Counterpart Patent Appl. No. 104137598, dated Nov. 30, 2016.
International Preliminary Report on Patentability issued in Patent Application No. PCT/JP2015/081742, dated Jun. 1, 2017.

* cited by examiner

*Primary Examiner* — Douglas J McGinty
(74) *Attorney, Agent, or Firm* — Greenblum & Bernstein, P.L.C.

(57) ABSTRACT

The present invention provides a refrigerating machine oil comprising: a base oil comprising an ester of a polyhydric alcohol and a fatty acid comprising 20 to 100% by mol of a branched fatty acid having 4 to 9 carbon atoms; and 0.2 to 0.5% by mass of a phenol-based antioxidant based on a total amount of the refrigerating machine oil, and the refrigerating machine oil being used with trifluoroethylene refrigerant.

8 Claims, No Drawings

REFRIGERATION OIL AND WORKING FLUID COMPOSITION FOR REFRIGERATION OIL

TECHNICAL FIELD

The present invention relates to a refrigerating machine oil and a working fluid composition for a refrigerating machine.

BACKGROUND ART

CFC (chlorofluorocarbon) and HCFC (hydrochlorofluorocarbon), which have been conventionally used as refrigerants for refrigeration equipment, have been subject to regulation due to the problem of recent ozone layer depletion, and HFCs (hydrofluorocarbons) have been increasingly used as refrigerants instead of them. Among HFC refrigerants, however, HFC-134a normally used as a refrigerant for a car air-conditioner is subject to regulation in Europe because the global warming potential (GWP) is high while the ozone layer depletion potential (ODP) is zero.

Under such a background, it is imperative that a refrigerant having a low impact on the ozone layer and being low in GWP be developed. For example, Patent Literature 1 discloses trifluoroethylene (HFO-1123) refrigerant as the refrigerant having a low impact on the ozone layer and being low in GWP.

While hydrocarbon oil such as mineral oil or alkylbenzene has been suitably used as the refrigerating machine oil in the case of use of conventional CFC or HCFC as a refrigerant, the refrigerating machine oil exhibits, depending on the type of a coexisting refrigerant, unpredictable behaviors with respect to compatibility with the refrigerant, lubricity, dissolution viscosity in the refrigerant, thermal/chemical stability and the like, and therefore a refrigerating machine oil with respect to each refrigerant is required to be developed.

CITATION LIST

Patent Literature

Patent Literature 1: International Publication WO 2012/157764

SUMMARY OF INVENTION

Technical Problem

An object of the present invention is to provide a refrigerating machine oil excellent in suitability with trifluoroethylene (HFO-1123) refrigerant, and a working fluid composition for a refrigerating machine, comprising the refrigerating machine oil.

Solution to Problem

The present invention provides a A refrigerating machine oil comprising: a base oil comprising an ester of a polyhydric alcohol and a fatty acid comprising 20 to 100% by mol of a branched fatty acid having 4 to 9 carbon atoms; and 0.2 to 0.5% by mass of a phenol-based antioxidant based on a total amount of the refrigerating machine oil, and the refrigerating machine oil being used with trifluoroethylene refrigerant.

It is preferable that the phenol-based antioxidant contain 2,6-di-tert.-butyl-p-cresol.

The present invention also provides a working fluid composition for a refrigerating machine, comprising the refrigerating machine oil and trifluoroethylene refrigerant.

Advantageous Effects of Invention

According to the present invention, it is possible to provide a refrigerating machine oil excellent in suitability with trifluoroethylene (HFO-1123) refrigerant, and a working fluid composition for a refrigerating machine, comprising the refrigerating machine oil.

DESCRIPTION OF EMBODIMENTS

Hereinafter, a suitable embodiment of the present invention is described in detail.

A refrigerating machine oil according to the present embodiment comprises a base oil containing an ester of a polyhydric alcohol and a fatty acid comprising 20 to 100% by mol of a branched fatty acid having 4 to 9 carbon atoms, and 0.2 to 0.5% by mass of a phenol-based antioxidant based on the total amount of the refrigerating machine oil, and the refrigerating machine oil is used with trifluoroethylene refrigerant.

In addition, a working fluid composition for a refrigerating machine according to the present embodiment comprises: a refrigerating machine oil comprising a base oil containing an ester of a polyhydric alcohol and a fatty acid comprising 20 to 100% by mol of a branched fatty acid having 4 to 9 carbon atoms, and 0.2 to 0.5% by mass of a phenol-based antioxidant based on the total amount of the refrigerating machine oil; and trifluoroethylene refrigerant. The working fluid composition for a refrigerating machine according to the present embodiment encompasses an aspect of a working fluid composition for a refrigerating machine, comprising the refrigerating machine oil according to the present embodiment, and trifluoroethylene refrigerant.

The base oil according to the present embodiment contains an ester of a polyhydric alcohol and a fatty acid containing 20 to 100% by mol of a branched fatty acid having 4 to 9 carbon atoms. Specific examples of the branched fatty acid having 4 to 9 carbon atoms include branched butanoic acid, branched pentanoic acid, branched hexanoic acid, branched heptanoic acid, branched octanoic acid and branched nonanoic acid. More specifically, a fatty acid branched at the α-position and/or β-position is preferable, isobutanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, and the like are preferable, and in particular, 2-ethylhexanoic acid and/or 3,5,5-trimethylhexanoic acid are/is more preferable.

The fatty acid may also include any fatty acid other than the branched fatty acid having 4 to 9 carbon atoms. As such a fatty acid other than the branched fatty acid having 4 to 9 carbon atoms, linear fatty acids having 4 to 9 carbon atoms (namely, n-butanoic acid, n-pentanoic acid, n-hexanoic acid, n-heptanoic acid, n-octanoic acid and n-nonanoic acid) are preferably used. Among them, pentanoic acid and/or heptanoic acid are/is more preferable.

The fatty acid may also include, as any fatty acid other than the fatty acid having 4 to 9 carbon atoms, for example, a fatty acid having 10 to 24 carbon atoms. Specific examples of such a fatty acid other than the fatty acid having 4 to 9 carbon atoms include linear or branched decanoic acid, linear or branched undecanoic acid, linear or branched dodecanoic acid, linear or branched tridecanoic acid, linear or branched tetradecanoic acid, linear or branched pentadecanoic acid, linear or branched hexadecanoic acid, linear or branched heptadecanoic acid, linear or branched octadecanoic acid, linear or branched nonadecanoic acid, linear or branched icosanoic acid, linear or branched heneicosanoic acid, linear or branched docosanoic acid, linear or branched tricosanoic acid and linear or branched tetracosanoic acid.

The ratio of the branched fatty acid having 4 to 9 carbon atoms in the fatty acid is 20% by mol or more, preferably 30% by mol or more, more preferably 50% by mol or more from the viewpoint of an enhancement in stability in the presence of the trifluoroethylene refrigerant. The ratio of the branched fatty acid having 4 to 9 carbon atoms in the fatty acid is 100% by mol or less, preferably 80% by mol or less, more preferably 60% by mol or less from the viewpoint of an enhancement in lubricity in the presence of the trifluoroethylene refrigerant. The ratio of the branched fatty acid having 4 to 9 carbon atoms in the fatty acid is preferably 20 to 100% by mol, 20 to 80% by mol, 20 to 60% by mol, 30 to 100% by mol, 30 to 80% by mol, 30 to 60% by mol, 50 to 100% by mol, 50 to 80% by mol, or 50 to 60% by mol, from the viewpoint that both stability and lubricity are satisfied in the presence of the trifluoroethylene refrigerant.

As the polyhydric alcohol, a polyhydric alcohol having 2 to 6 hydroxyl groups is preferably used. The number of carbon atoms in the polyhydric alcohol is preferably 4 to 12, more preferably 5 to 10. Specifically, hindered alcohols such as neopentyl glycol, trimethylolethane, trimethylolpropane, trimethylolbutane, di-(trimethylolpropane), tri-(trimethylolpropane), pentaerythritol and dipentaerythritol are preferable. More preferable is pentaerythritol, or a mixed alcohol of pentaerythritol and dipentaerythritol because of being particularly excellent in compatibility with the refrigerant, and hydrolysis stability.

The base oil according to the present embodiment may further contain, in addition to the ester of a polyhydric alcohol and a fatty acid containing 20 to 100% by mol of a branched fatty acid having 4 to 9 carbon atoms, for example, oxygen-containing oil such as any ester other than the ester, polyalkylene glycol or polyvinyl ether, mineral oil, an olefin polymer, a naphthalene compound, and/or hydrocarbon oil such as alkylbenzene.

The content of the ester of a polyhydric alcohol and a fatty acid containing 20 to 100% by mol of a branched fatty acid having 4 to 9 carbon atoms, is preferably 50% by mass or more, more preferably 70% by mass or more, further preferably 90% by mass or more based on the total amount of the refrigerating machine oil.

Examples of the phenol-based antioxidant include 4,4'-methylenebis(2,6-di-tert.-butylphenol), 4,4'-bis(2,6-di-tert.-butylphenol), 4,4'-bis(2-methyl-6-tert.-butylphenol), 2,2'-methylenebis(4-ethyl-6-tert.-butylphenol), 2,2'-methylenebis(4-methyl-6-tert.-butylphenol), 4,4'-butylidenebis(3-methyl-6-tert.-butylphenol), 4,4'-isopropylidenebis(2,6-di-tert.-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol), 2,6-di-tert.-butyl-p-cresol, 2,6-di-tert.-butyl-4-ethylphenol, 2,4-dimethyl-6-tert.-butylphenol, 2,6-di-tert.-α-dimethylamino-p-cresol, 2,6-di-tert.-butyl-4 (N,N'-dimethylaminomethylphenol), 4,4'-thiobis(2-methyl-6-tert.-butylphenol), 4,4'-thiobis(3-methyl-6-tert.-butylphenol), 2,2'-thiobis(4-methyl-6-tert.-butylphenol), bis(3-methyl-4-hydroxy-5-tert.-butylbenzyl)sulfide, bis(3,5-di-tert.-butyl-4-hydroxybenzyl)sulfide, 2,2'-thio-diethylenebis[3-(3,5-di-tert.-butyl-4-hydroxyphenyl)propionate], tridecyl-3-(3,5-di-tert.-butyl-4-hydroxyphenyl)propionate, pentaerythrityl-tetrakis[3-(3,5-di-tert.-butyl-4-hydroxyphenyl)propionate], octyl-3-(3,5-di-tert.-butyl-4-hydroxyphenyl)propionate, octadecyl-3-(3,5-di-tert.-butyl-4-hydroxyphenyl)propionate, and 3-methyl-5-tert.-butyl-4-hydroxyphenyl-substituted fatty acid esters. These may be used singly or as a mixture of two or more. The phenol-based antioxidant is preferably 2,6-di-tert.-butyl-p-cresol from the viewpoint of an enhancement in stability in the presence of the trifluoroethylene refrigerant.

The content of the phenol-based antioxidant is preferably 0.2% by mass or more, more preferably 0.25% by mass or more, further preferably 0.3% by mass or more based on the total amount of the refrigerating machine oil from the viewpoint of an enhancement in stability in the presence of the trifluoroethylene refrigerant. The content of the phenol-based antioxidant is preferably 0.5% by mass or less, more preferably 0.45% by mass or less, further preferably 0.4% by mass or less based on the total amount of the refrigerating machine oil from the viewpoint of suppression of coloration of the refrigerating machine oil. The content of the phenol-based antioxidant is preferably 0.2 to 0.5% by mass, 0.2 to 0.45% by mass, 0.2 to 0.4% by mass, 0.25 to 0.5% by mass, 0.25 to 0.45% by mass, 0.25 to 0.4% by mass, 0.3 to 0.5% by mass, 0.3 to 0.45% by mass, or 0.3 to 0.4% by mass from the viewpoint that both an enhancement in stability and suppression of coloration of the refrigerating machine oil are satisfied in the presence of the trifluoroethylene refrigerant.

The refrigerating machine oil according to the present embodiment may further contain, in addition to the phenol-based antioxidant, another additive. Examples of such an additive include an acid scavenger, an antioxidant other than a phenol-based antioxidant, an extreme-pressure agent, an oiliness agent, a defoaming agent, a metal inactivating agent, an antiwear agent, a viscosity index improver, a pour-point depressant and a detergent dispersant. The content of another additive can be, for example, 5% by mass or less based on the total amount of the refrigerating machine oil.

It is preferable that the refrigerating machine oil further contain, among the above additives, an acid scavenger from the viewpoint of a more enhancement in thermal/chemical stability. Examples of the acid scavenger include an epoxy compound and a carbodiimide compound.

Examples of the epoxy compound include, but not particularly limited, a glycidyl ether type epoxy compound, a glycidyl ester type epoxy compound, an oxirane compound, an alkyloxirane compound, an alicyclic epoxy compound, epoxidized fatty acid monoesters and epoxidized vegetable oil. Such an epoxy compound can be used singly or in combinations of two or more.

Examples of the glycidyl ether type epoxy compound include n-butyl phenyl glycidyl ether, i-butyl phenyl glycidyl ether, sec-butyl phenyl glycidyl ether, tert.-butyl phenyl glycidyl ether, pentyl phenyl glycidyl ether, hexyl phenyl glycidyl ether, heptyl phenyl glycidyl ether, octyl phenyl glycidyl ether, nonyl phenyl glycidyl ether, decyl phenyl glycidyl ether, decyl glycidyl ether, undecyl glycidyl ether, dodecyl glycidyl ether, tridecyl glycidyl ether, tetradecyl glycidyl ether, 2-ethylhexylglycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether and polyalkylene glycol diglycidyl ether.

Examples of the glycidyl ester type epoxy compound include glycidyl benzoate, glycidyl neodecanoate, glycidyl-2,2-dimethyloctanoate, glycidyl acrylate and glycidyl methacrylate.

The alicyclic epoxy compound refers to a compound having a partial structure where carbon atoms constituting an epoxy group directly constitute an alicyclic ring, represented by the following formula (1).

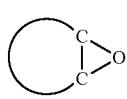

Examples of the alicyclic epoxy compound include 1,2-epoxycyclohexane, 1,2-epoxycyclopentane, 3,4'-epoxycyclohexylmethyl-3,4-epoxycyclohexanecarboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane and 4-epoxyethyl-1,2-epoxycyclohexane.

Examples of the allyloxirane compound include 1,2-epoxystyrene and alkyl-1,2-epoxystyrenes.

Examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyicosane.

Examples of the epoxidized fatty acid monoesters include esters of epoxidized fatty acids having 12 to 20 carbon atoms with alcohols having 1 to 8 carbon atoms, or phenols or alkylphenols. As the epoxidized fatty acid monoesters, butyl, hexyl, benzyl, cyclohexyl, methoxyethyl, octyl, phenyl and butyl phenyl esters of epoxystearic acid are preferably used.

Examples of the epoxidized vegetable oil include an epoxy compound of vegetable oil such as soybean oil, flaxseed oil and cottonseed oil.

As the carbodiimide compound, for example, dialkyl carbodiimides, diphenyl carbodiimides, and bis(alkylphenyl)carbodiimides can be used, but not particularly limited. Examples of the dialkyl carbodiimides include diisopropyl carbodiimide and dicyclohexyl carbodiimide. Examples of the bis(alkylphenyl)carbodiimides include ditolyl carbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide and bis(nonylphenyl)carbodiimide.

It is preferable that the refrigerating machine oil further contain, among the above additives, a phosphorus-based extreme-pressure agent from the viewpoint of a more enhancement in antiwear property. Examples of the phosphorus-based extreme-pressure agent include phosphoric acid esters, acidic phosphoric acid esters, thiophosphoric acid esters, amine salts of acidic phosphoric acid esters, chlorinated phosphoric acid esters, and phosphorous acid esters.

Examples of the phosphoric acid esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate and xylenyl diphenyl phosphate.

Examples of the acidic phosphoric acid esters include monobutyl acid phosphate, monopentyl acid phosphate, monohexyl acid phosphate, monoheptyl acid phosphate, monooctyl acid phosphate, mononoyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate.

Examples of the thiophosphoric acid esters include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate and xylenyldiphenyl phosphorothionate.

Examples of the amine salts of acidic phosphoric acid esters include salts of the acidic phosphoric acid esters with amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine.

Examples of the chlorinated phosphoric acid esters include tris(dichloropropyl) phosphate, tris(chloroethyl) phosphate, tris(chlorophenyl) phosphate and polyoxyalkylene-bis[di(chloroalkyl)]phosphate.

Examples of the phosphorous acid esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite and tricresyl phosphite.

The content of the phosphorus-based extreme-pressure agent is preferably 0.1% by mass or more, more preferably 0.5% by mass or more, further preferably 0.9% by mass or more based on the total amount of the refrigerating machine oil from the viewpoint of an enhancement in lubricity in the presence of the trifluoroethylene refrigerant. The content of the phosphorus-based extreme-pressure agent is preferably 2.0% by mass or less, more preferably 1.5% by mass or less, further preferably 1.0% by mass or less based on the total amount of the refrigerating machine oil from the viewpoint of an enhancement in stability in the presence of the trifluoroethylene refrigerant.

The content of the base oil is preferably 80% by mass or more, more preferably 90% by mass or more, further preferably 95% by mass or more based on the total amount of the refrigerating machine oil in order that characteristics required for the refrigerating machine oil, such as lubricity, compatibility, thermal/chemical stability, and electrical insulation properties, are excellent.

The kinematic viscosity at 40° C. of the refrigerating machine oil may be preferably 3 to 1000 mm$^2$/s, more preferably 4 to 500 mm$^2$/s, further preferably 5 to 400 mm$^2$/s. The kinematic viscosity at 100° C. of the refrigerating machine oil may be preferably 1 to 100 mm$^2$/s, more preferably 2 to 50 mm$^2$/s. The kinematic viscosity in the present invention means the kinematic viscosity measured according to JIS K2283.

The pour point of the refrigerating machine oil may be preferably −10° C. or less, more preferably −20° C. or less. The pour point in the present invention means the pour point measured according to JIS K2269.

The volume resistivity of refrigerating machine oil may be preferably $1.0 \times 10^9$ Ω·m or more, more preferably $1.0 \times 10^{10}$ Ω·m or more, further preferably $1.0 \times 10^{11}$ Ω·m or more. In particular, in the case of use for a hermetic type refrigerating machine, high electrical insulation properties tends to be required. The volume resistivity in the present invention means the volume resistivity measured at 25° C. according to JIS C2101 "Electrical insulating oil test method".

The moisture content in the refrigerating machine oil may be preferably 200 ppm or less, more preferably 100 ppm or less, further preferably 50 ppm or less based on the total amount of the refrigerating machine oil. In particular, in the case of use for a hermetic type refrigerating machine, the moisture content is preferably to be low from the viewpoints of thermal/chemical stability of the refrigerating machine oil and the influence on electrical insulation properties.

The acid value of the refrigerating machine oil may be preferably 0.1 mgKOH/g or less, more preferably 0.05 mgKOH/g or less in order that a metal used in a refrigerating machine or a pipe is prevented from corroding, and that an ester contained in the refrigerating machine oil is prevented from being decomposed. The acid value in the present invention means the acid value measured according to HS K2501 "Petroleum products and lubricant oils-neutralization test method".

The ash content of the refrigerating machine oil may be preferably 100 ppm or less, more preferably 50 ppm or less in order that thermal/chemical stability of the refrigerating machine oil according to the present embodiment is enhanced to suppress the occurrence of sludge and the like. The ash content in the present invention means the ash content measured according to HS K2272 "Crude oils and petroleum products-ash and sulfated ash test method".

The refrigerating machine oil according to the present embodiment is used with trifluoroethylene (HFO-1123) refrigerant. In addition, the working fluid composition for a refrigerating machine according to the present embodiment comprises trifluoroethylene (HFO-1123) refrigerant.

The refrigerant used with the refrigerating machine oil according to the present embodiment, and the refrigerant which the working fluid composition for a refrigerating machine according to the present embodiment comprises may further contain, in addition to trifluoroethylene (HFO-1123), a known refrigerant such as a saturated fluorohydrocarbon refrigerant or an unsaturated fluorohydrocarbon refrigerant. The content of trifluoroethylene (HFO-1123) is preferably 90% by mass or less, more preferably 60% by mass or less, further preferably 50% by mass or less, particularly preferably 40% by mass or less, most preferably 20% by mass or less based on the total amount of the refrigerant from the viewpoint of stability of the refrigerating machine oil under a refrigerant atmosphere. The content of trifluoroethylene (HFO-1123) is preferably 20% by mass or more, more preferably 40% by mass or more, further preferably 50% by mass or more, particularly preferably 60% by mass or more, most preferably 90% by mass or more based on the total amount of the refrigerant from the viewpoint of a reduction in GWP.

Examples of the saturated fluorohydrocarbon refrigerant include one or a mixture of two or more selected from the group consisting of difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365mfc). Among them, difluoromethane (HFC-32) and 1,1,1,2-tetrafluoroethane (HFC-134a) are preferable from the viewpoints of stability of the refrigerating machine oil under a refrigerant atmosphere and a reduction in GWP.

Examples of the unsaturated fluorohydrocarbon refrigerant include one or a mixture of two or more selected from the group consisting of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye) and 3,3,3-trifluoropropene (HFO-1243zf). Among them, 2,3,3,3-tetrafluoropropene (HFO-1234yf) is preferable from the viewpoints of stability of the refrigerating machine oil under a refrigerant atmosphere and a reduction in GWP.

The content of the refrigerating machine oil in the working fluid composition for a refrigerating machine is not particularly limited, but may be preferably 1 to 500 parts by mass, more preferably 2 to 400 parts by mass relative to 100 parts by mass of the refrigerant.

The working fluid composition for a refrigerating machine and the refrigerating machine oil according to the present embodiment are preferably used for a room-air conditioner and a cold storage chamber having a reciprocating or rotary hermetic type compressor, or an open type or hermetic type car air-conditioner. The working fluid composition for a refrigerating machine and the refrigerating machine oil, according to the present embodiment, are preferably used for cooling apparatuses of a dehumidifier, a water heater, a freezer, a refrigeration and cold storage warehouse, a vending machine, a showcase, a chemical plant, and the like. The working fluid composition for a refrigerating machine and the refrigerating machine oil, according to the present embodiment, are also preferably used for a refrigerating machine having a centrifugal compressor.

EXAMPLES

Hereinafter, the present invention is more specifically described with reference to Examples, but the present invention is not limited to the following Examples.

Polyol esters of fatty acid with polyhydric alcohol, having compositions shown in Table 1, as base oils, and the following polyvinyl ether were prepared. Abbreviations in the Tables represent the following compounds.
iC4: 2-methylpropanoic acid
nC5: n-pentanoic acid
iC8: 2-ethylhexanoic acid
iC9: 3,5,5-trimethylhexanoic acid
PET: pentaerythritol

TABLE 1

|  |  | Base oil 1 | Base oil 2 | Base oil 3 |
|---|---|---|---|---|
| Composition of fatty acid (% by mol) | iC4 | — | 35 | — |
|  | nC5 | — | — | 40 |
|  | iC8 | 50 | — | — |
|  | iC9 | 50 | 65 | 60 |
| Polyhydric alcohol |  | PET | PET | PET |

Base oils and the following additives were used to prepare sample oils having respective compositions shown in Tables 2 and 3.
Additive 1: 2,6-di-tert.-butyl-p-cresol
Additive 2: dioctyl diphenylamine
Additive 3: tricresyl phosphate
Additive 4: glycidyl neodecanoate
Additive 5: 2-ethylhexyl glycidyl ether

TABLE 2

|  |  | Sample oil 1 | Sample oil 2 | Sample oil 3 | Sample oil 4 | Sample oil 5 |
|---|---|---|---|---|---|---|
| Composition of sample oil (% by mass, based on total amount of sample oil) | Base oil 1 | 99.3 | 99.3 | — | — | — |
|  | Base oil 2 | — | — | 99.4 | 99.3 | — |
|  | Base oil 3 | — | — | — | — | 99.0 |
|  | Additive 1 | 0.2 | — | 0.1 | 0.2 | 0.5 |
|  | Additive 2 | — | 0.2 | — | — | — |
|  | Additive 3 | — | — | — | — | — |
|  | Additive 4 | 0.5 | 0.5 | — | — | 0.5 |
|  | Additive 5 | — | — | 0.5 | 0.5 | — |

TABLE 3

|  |  | Sample oil 6 | Sample oil 7 | Sample oil 8 | Sample oil 9 | Sample oil 10 |
|---|---|---|---|---|---|---|
| Composition of sample oil (% by mass, based on total amount of sample oil) | Base oil 1 | — | 99.1 | 98.8 | 98.4 | 98.3 |
|  | Base oil 2 | — | — | — | — | — |
|  | Base oil 3 | 98.9 | — | — | — | — |
|  | Additive 1 | 0.6 | 0.2 | 0.2 | 0.2 | 0.2 |
|  | Additive 2 | — | — | — | — | — |
|  | Additive 3 | — | 0.2 | 0.5 | 0.9 | 1.0 |
|  | Additive 4 | 0.5 | 0.5 | — | 0.5 | 0.5 |
|  | Additive 5 | — | — | 0.5 | — | — |

The respective sample oils were subjected to the following antiwear property test. The results are shown in Tables 4 and 5.

(Antiwear Property Test)

A high-pressure atmosphere friction tester (a rotating and sliding system of a rotary vane material and a fixed disc material) manufactured by Shinko Engineering Co., Ltd., enabling generation of a refrigerant atmosphere similar to that of an actual compressor, was used to perform an antiwear property test. The test conditions were as follows: the pressure in a test vessel: 1.6 MPa; the amount of oil: 600 ml; the test temperature: 110° C.; the number of rotations: 500 rpm; the load applied: 80 kgf; and the test time: 1 hour. SKH-51 was used as the vane material, and FC250 was used as the disc material. Evaluation of the antiwear property was performed based on the wear depth of the vane material because the amount of the disc material abraded was extremely small. The following mixed refrigerants A to C were each used as the refrigerant.

Mixed refrigerant A: mixed refrigerant of 2,3,3,3-tetrafluoropropene (HFO-1234yf) and trifluoroethylene (HFO-1123) (mass ratio (HFO-1234yf/HFO-1123)=80/20)

Mixed refrigerant B: mixed refrigerant of difluoromethane (HFC-32) and trifluoroethylene (HFO-1123) (mass ratio (HFC-32/HFO-1123)=40/60)

Mixed refrigerant C: mixed refrigerant of 1,1,1,2-tetrafluoroethane (HFC-134a) and trifluoroethylene (HFO-1123) (mass ratio (HFC-134a/HFO-1123)=20/80)

TABLE 4

|  |  | Sample oil 1 | Sample oil 2 | Sample oil 3 | Sample oil 4 | Sample oil 5 |
|---|---|---|---|---|---|---|
| Wear depth ($\mu$m) | Mixed refrigerant A | 15.1 | 14.5 | 13.6 | 13.3 | 17.3 |
|  | Mixed refrigerant B | 15.2 | 16.7 | 11.6 | 12.5 | 15.9 |
|  | Mixed refrigerant C | 12.1 | 13.3 | 12.8 | 11.9 | 14.8 |

TABLE 5

|  |  | Sample oil 6 | Sample oil 7 | Sample oil 8 | Sample oil 9 | Sample oil 10 |
|---|---|---|---|---|---|---|
| Wear depth ($\mu$m) | Mixed refrigerant A | 17.9 | 11.1 | 10.5 | 9.5 | 8.9 |
|  | Mixed refrigerant B | 15.3 | 9.9 | 8.7 | 8.8 | 7.6 |
|  | Mixed refrigerant C | 13.9 | 10.1 | 10.3 | 7.3 | 6.7 |

Sample oils 1 to 6 were subjected to the following stability test. The results are shown in Table 6. In the Table, the presence or absence of precipitation was shown in brackets. Coloration was observed in sample oil 2 and sample oil 6.

(Stability Test)

The stability test was performed according to JIS K2211-09 (autoclave test). Specifically, 80 g of each sample oil where the moisture content was adjusted to 100 ppm was weighed and taken in an autoclave, a catalyst (iron, copper and aluminum wires each having an outer diameter of 1.6 mm and a length of 50 mm) and 20 g of any of mixed refrigerants A to C above were encapsulated therein, thereafter the resultant was heated to 140° C., and the acid value (JIS C2101) of the sample oil after 150 hours was measured.

TABLE 6

|  |  | Sample oil 1 | Sample oil 2 | Sample oil 3 | Sample oil 4 | Sample oil 5 | Sample oil 6 |
| --- | --- | --- | --- | --- | --- | --- | --- |
| Acid value (mgKOH/g) | Mixed refrigerant A | 0.49 (Absence) | 0.84 (Absence) | 0.92 (Absence) | 0.34 (Absence) | 0.61 (Absence) | 0.53 (Absence) |
|  | Mixed refrigerant B | 0.05 (Absence) | 0.42 (Absence) | 0.37 (Absence) | 0.10 (Absence) | 0.14 (Absence) | 0.15 (Absence) |
|  | Mixed refrigerant C | 0.35 (Absence) | 0.77 (Absence) | 0.68 (Absence) | 0.51 (Absence) | 0.39 (Absence) | 0.47 (Absence) |

The invention claimed is:

1. A working fluid composition for a refrigerating machine, comprising:
   trifluoroethylene refrigerant and
   a refrigerating machine oil comprising:
   a) a base oil comprising an ester of
      i. a polyhydric alcohol and
      ii. a fatty acid comprising 20 to 100% by mol of a branched fatty acid having 4 to 9 carbon atoms; and
   b) 0.2 to 0.5% by mass of a phenol-based antioxidant based on a total amount of the refrigerating machine oil.

2. The working fluid composition for a refrigerating machine according to claim 1, wherein the phenol-based antioxidant comprises 2,6-di-tert.-butyl-p-cresol.

3. The working fluid composition for a refrigerating machine according to claim 1, wherein the polyhydric alcohol comprises pentaerythritol or dipentaerythritol.

4. The working fluid composition for a refrigerating machine according to claim 1, wherein the refrigerating machine oil further comprises an acid scavenger.

5. The working fluid composition for a refrigerating machine according to claim 4, wherein the acid scavenger comprises an epoxy compound, a carbodiimide compound, or a mixture thereof.

6. The working fluid composition for a refrigerating machine according to claim 1, wherein a kinematic viscosity at 40° C. of the refrigerating machine oil is from 4 to 500 mm$^2$/s.

7. The working fluid composition for a refrigerating machine according to claim 3, wherein the polyhydric alcohol comprises a mixture of pentaerythritol and dipentaerythritol.

8. The working fluid composition for a refrigerating machine according to claim 1, wherein the fatty acid further comprises a fatty acid having 10 to 24 carbon atoms or a linear fatty acid having 4 to 9 carbon atoms.

\* \* \* \* \*